May 17, 1955 E. G. VON GUNTEN 2,708,269
EYE SHADE
Filed June 21, 1951 2 Sheets-Sheet 1

INVENTOR.
EDWARD G. VON GUNTEN
BY
ATTORNEY

May 17, 1955  E. G. VON GUNTEN  2,708,269
EYE SHADE
Filed June 21, 1951  2 Sheets-Sheet 2
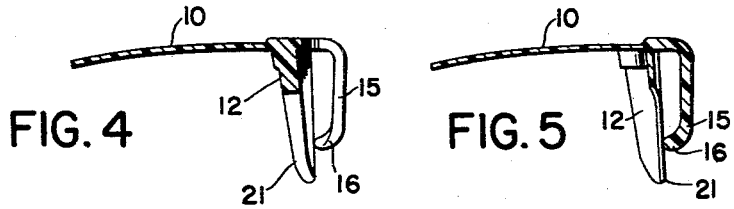
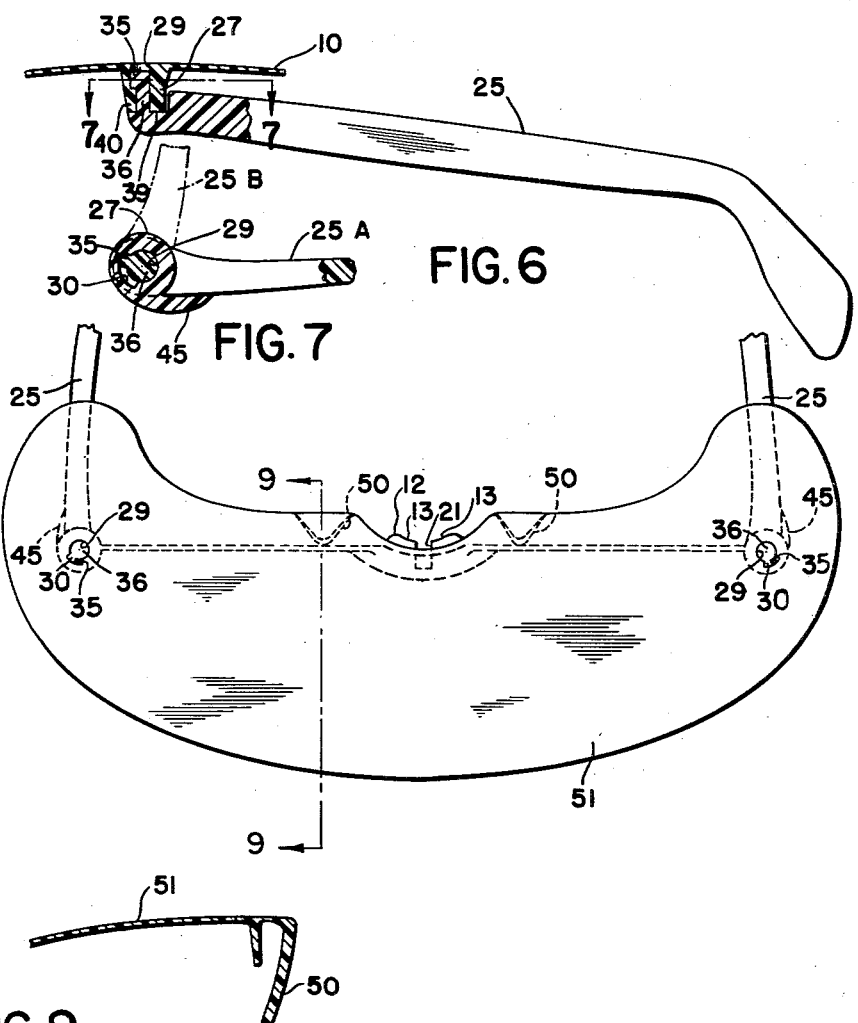
INVENTOR.
EDWARD G. VON GUNTEN
BY
ATTORNEY United States Patent Office 2,708,269
Patented May 17, 1955

2,708,269

EYE SHADE

Edward G. Von Gunten, Akron, Ohio, assignor, by decree of distribution, to Maggie B. Von Gunten Application June 21, 1951, Serial No. 232,757

6 Claims. (Cl. 2—13)

This invention relates to an improved eye shade.

Various eye shades have been placed on the market but none of these can be used satisfactorily by a person who wears nose glasses. The eye shade of this invention includes clips to fasten the shade onto the nose glasses and temples to extend back from the ends of the eye shade over the ears of the wearer to keep the eye shade in position and prevent its bending the nose glasses forward.

The temples of the eye shade are removable so that a person wearing eye glasses with temples can wear the eye shade without the temples. He can, of course, wear the eye shade with the temples and thus duplicate the function of the temples on his eye glasses, if he so desires.

The preferred eye shade is built with a nose piece which rests on the nose of the wearer when the eye shade is worn by a person wearing nose glasses or eye glasses. Such an eye shade may be worn by a person not wearing eye glasses, if desired. In this event the nose support of the eye shade rests on the nose of the wearer and the temples position the eye shade so that it is held symmetrically in place over the eyes of the wearer.

The invention will be further described in connection with the drawings in which Fig. 1 is a front view showing the eye shade clipped on nose glasses, with the temples of the eye shade extending rearwardly.

Fig. 4 is a section on the line 4—4 of Fig. 1.

Fig. 5 is a section on the line 5—5 of Fig. 1.

Fig. 6 is a view on line 6—6 of Fig. 1 showing one temple and the socket.

Fig. 7 is a view on the line 7—7 of Fig. 6, partly broken away.

Fig. 8 is a plan view of a modified eye shade.

Fig. 9 is a section on the line 9—9 of Fig. 8.

Figure 1:
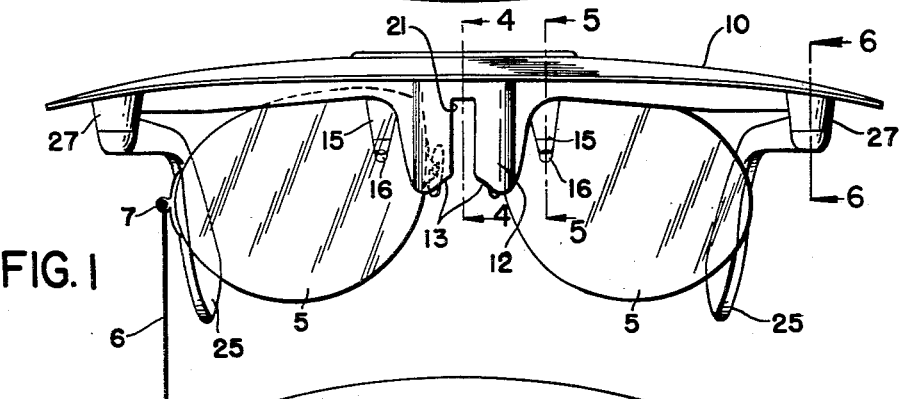
Figure 3:
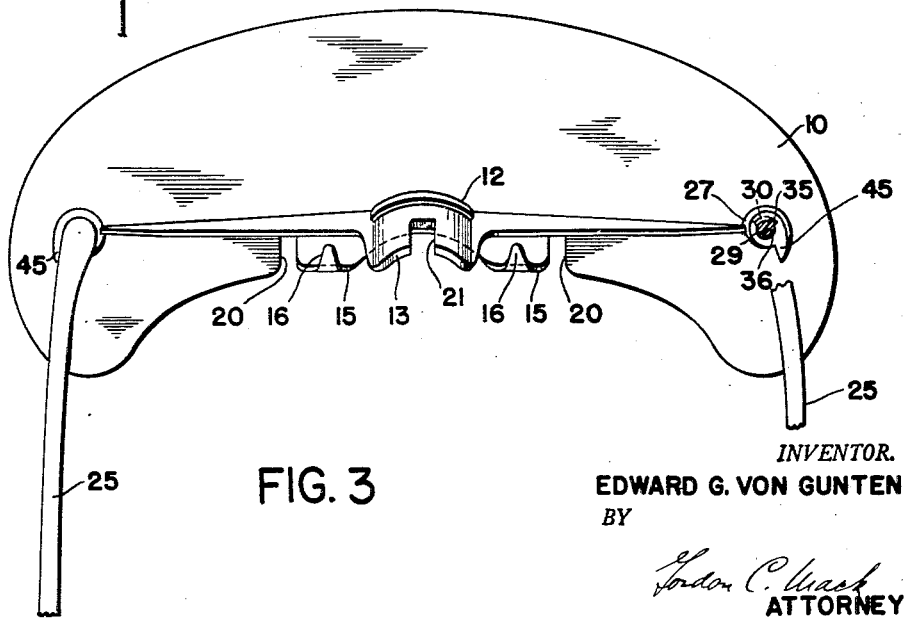
Fig. 3 is a bottom view of the eye shade.

The eye glasses 5 of Fig. 1 are not part of the invention. They may be of any design. Those shown are provided with a string or ribbon 6 threaded through the eyelet 7.

The shade member 10 is provided along its center line and toward the rear with the nose support 12 which extends downwardly. The bottom edge 13 of the nose support is rounded to more or less conform to the outer surface of the nose of the wearer. At each side of the nose support are clips 15 the bottom ends 16 of which are bent forwardly to contact the rear surfaces of the respective lenses of the nose glasses. Immediately outside of each of these clips the shade member 10 is cut away at 20 in order to give flexibility to the nose support and the clips. The nose support is slotted at 21, but this is not essential.

In order to position the shade properly on the nose glasses a narrow fin extends each way from the nose support 21 to the temples, and the tops of the lenses of the nose glasses are pressed against the rear of this fin by the clips 15, and prevent the nose glasses and the shade from falling forward, a temple 25 is provided at each end of the eye shade. These temples are movably fastened in sockets 27. There is a hole 29 extending through each socket substantially axially thereof and this hole is generally cylindrical. The segmental enlargement 30 extends outwardly from the cylindrical opening. This extension 30 of the opening accommodates the boss 35 on the pivot 36 of temple 25. The boss is only a part of the height of the opening 29 and it extends outwardly from the cylindrical pivot 36 which is substantially perpendicular to the temple. It rises from the upper surface 39 of the cutaway portion of the temple 25 which accommodates the socket 27.

Figure 2:
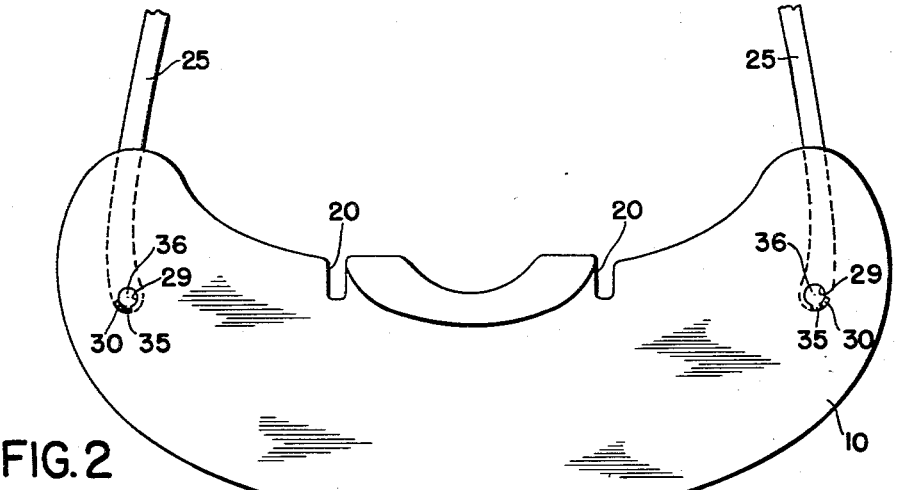
Fig. 2 is a top view of the eye shade.

The temple is removable. In order to locate the pivot 36 in the socket the temple is held in such a position that the boss 35 enters the segmental opening 30. Referring to Fig. 2 it will be seen that in order to do this the temple must be folded inwardly toward the eye shade. After the temple is located in the socket in this manner, it is swung out backwardly from the eye shade and in this position the boss is engaged over the portion 40 of the socket which holds it in place. Thus the temples can be swung backwardly from the eye shade to the position 25A of Fig. 7 (shown in full lines) from the position 25B (shown in broken lines). In the position 25A the temples extend backwardly from the eye shade and cannot be removed from the socket. In the position 25B the temples are folded inwardly toward the eye shade and can be removed from the socket. The stop 45 on the socket prevents the temples from being swung so far outwardly that they extend from the sides of the eye shade.

Although the eye shade is shown as being worn on nose glasses it can be worn by a person when he is not wearing glasses and it can also be worn on spectacles equipped with temples, in which latter case the temples 25 may be removed from the eye shade. Likewise, on certain types of nose glasses it may not be necessary to use the temples.

In the alternative design shown in Figs. 8 and 9 the clips 50 are not bent sharply inwardly at their bottoms but the whole of the clip inclines more or less forwardly, away from the wearer. There are no notches in the back edge of the eye shade 51 at the sides of the clips such as are provided in the eye shades shown in Figs. 1–7.

The eye shade is preferably made from cellulose acetate or other plastic. It may be made of any suitable plastic and may be colored as desired. The temples are molded separately but the balance of the eye shade is preferably molded as a unit. It may be colored as desired. The eye shade may be translucent or pigmented to any desired degree of opacity. Although in the preferred design the eye shade is held on nose glasses or spectacles by clips and a nose support, the nose support may be omitted and the shade clipped in place by any suitable means.

What I claim is:

1. An eye shade adapted to be worn by a person wearing eyeglasses, which eye shade includes a shade member and extending downwardly therefrom a nose rest adapted to rest on the nose of the wearer of the eye shade, a fin extending outwardly from each side of the nose rest and terminating in a socket provided near each end of the eye shade, a temple removably fastened in each socket, and clip means extending downwardly from the eye shade to the rear of each fin and adapted to project downwardly in back of the eyeglasses without contacting the same except that the lower extremities of said clip means point forwardly and are adapted to press against the rear of the eyeglasses when the front upper edges of the eyeglasses are against the rear of the fins.

2. The eye shade of claim 1 in which projections on the forward ends of the respective temples are located in the respective sockets, there being an enlargement of each socket away from the surface thereof nearest the forward end of the temple, means on said projections rotatably engaged in the respective enlargements, each socket being shaped to permit passage of said means into it when the projection is in a certain position relative to the shade while preventing the passage of said means out of it with the temple in any other position.

3. An eye shade adapted to be worn by a person wearing eyeglasses, which eye shade includes a shade member, a nose rest fastened to the eye shade and adapted to rest on the nose of the wearer of the eye shade, means adapted to contact the top of the front of the eyeglasses and a resilient clip on each side of the nose rest which clip depends from the shade member sufficiently to the rear of the nose rest to be out of contact with the top portion of the rear of the eyeglasses with a portion thereof adapted to press yieldingly forward against the rear of the eyeglasses near the nose rest and below said top portion.

4. An eye shade adapted to be worn by a person wearing eyeglasses, which eye shade includes means on the undersurface thereof adapted to contact the top of the front of the eyeglasses and a clip member on each side of the centerline of the eye shade which extends downwardly therefrom with forwardly extending means adapted to press against the rear of the eyeglasses at points a substantial distance below the top thereof.

5. An eye shade which includes a plastic shade member having an opening in each end thereof, a portion of each opening being larger in area at one surface of the shade than at the other surface of the shade, two temples each with a projection at the forward end thereof, said projections being located in the respective openings with the temple adjacent the portion of the opening of smaller area, and an enlargement of the projection on each temple located in the larger portion of the opening, the openings being of such a shape as to permit the projections and enlargement thereof to pass through the respective openings when the temples are turned to a certain position with respect to the eye shade while preventing such passage when the temples are turned to any other position.

6. The eye shade of claim 5 in which means is provided to prevent the temples from being turned outwardly to a position a substantial distance beyond a position perpendicular to a line drawn through said openings.

References Cited in the file of this patent

UNITED STATES PATENTS

| | | |
|---|---|---|
| 1,806,524 | Donnelly | May 19, 1931 |
| 1,911,842 | Naulty | May 30, 1933 |
| 2,513,507 | Moeller | July 4, 1950 |
| 2,530,881 | Houston | Nov. 21, 1950 |
| 2,544,221 | Creighton | Mar. 6, 1951 |

FOREIGN PATENTS

| | | |
|---|---|---|
| 467,299 | Great Britain | June 15, 1937 |